June 20, 1944.   L. ROSA ET AL   2,352,011
DEVICE FOR FUNCTIONAL TEST OF ORGANS OF LIVING BODIES
Filed May 3, 1940
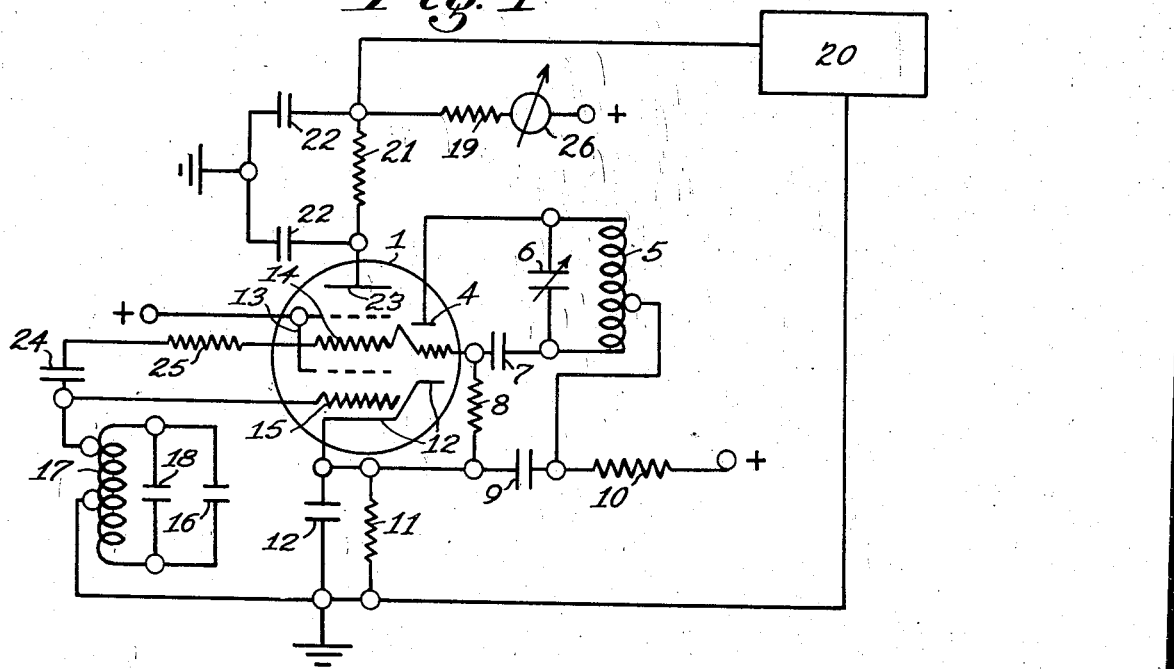
Fig. 1
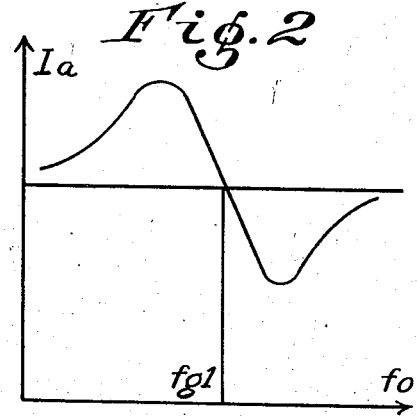
Fig. 2
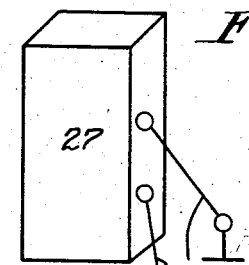
Fig. 3
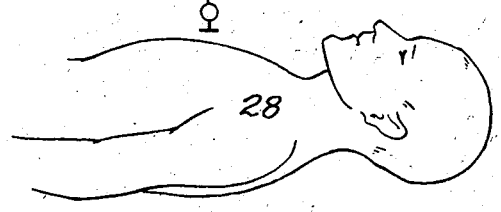
Inventors
LÁSZLÓ RÓSA
IMRE ZACHARIÁS
By
Attorney.

Patented June 20, 1944

2,352,011

UNITED STATES PATENT OFFICE 2,352,011

DEVICE FOR FUNCTIONAL TESTS OF ORGANS OF LIVING BODIES

László Rósa and Imre Zakariás, Budapest, Hungary; vested in the Alien Property Custodian Application May 3, 1940, Serial No. 333,232
In Hungary May 10, 1939

6 Claims. (Cl. 128—2.1)

The present invention relates to devices for functional test of organs of living bodies (f. i. heart, lungs, veins, muscles, etc.) for converting the variations of the resonant frequency and/or damping of a tuned circuit due to the action of the organ to be tested and placed nearby to said tuned circuit into energy having an amplitude proportionately to said frequency and/or damping variations.

Object of the invention is a device for functional test of organs comprising substantially beside said tuned circuit an electron discharge tube having at least two control electrodes or grids for controlling the space current passing from the cathode to the anode of the tube and one or two generators for alternating potentials preferably of high frequency. Impressing alternating potentials of the same frequency and in nearly quadrature phase relation on said control electrodes, there is produced by mutual intermodulation of the potentials on the electrodes in the anode current of said tube a component having an amplitude varying proportionately to the relative frequency departure of the potentials on the electrodes, which amplitude variations can be observed, recorded, i. e. used for functional test.

Said tube may be preferably of pentagrid-converter or triode-hexode type, in order to avoid the use of a particular oscillator tube. An alternating potential impressed on the first grid near the cathode of said tubes will cause a potential at the frequency of the impressed potential to be induced on the second control grid by unilateral space charge coupling, which is utilized in the case of the pentagrid-converter type. Using a triode-hexode type the space charge coupling is substantially eliminated by means of a condenser connecting the grids. In certain cases, especially very high frequencies, a resistance is advantageously placed in series with the coupling condenser in order to equalize the effect of the transit time of the electrons passing from one grid to the other. If the space charge coupling is neutralized in this manner a new unilateral coupling is produced between the grids in the opposed direction, i. e. from the second grid towards the first grid.

Figure 1 is a diagram of a circuit adapted for an embodiment of the invention.

Figure 2 is a characteristic curve explanatory of the function of the above circuit.

Figure 3 shows the arrangement for a heart action test.

Referring to Figure 1, item 1 represents a triode hexode; the cathode 2; the triode grid 3 and the triode anode 4 are connected in the known Hartley circuit to the tuned circuit comprising the inductance coil 5 and the preferably variable condenser 6 for exciting oscillations. The condenser 7 and the resistance 8 are known coupling elements in the grid circuit, the resistance 9 and the by-pass condenser 10 in the anode circuit, and the resistance 11 and the by-pass condenser 12 in the cathode circuit. Item 13 represents the screen grid of the hexode. The second control grid 14 of the hexode is connected to the grid 3 of the triode within the tube. The space charge coupling directed from the first grid 15 towards the second grid 14 is eliminated by the condenser 24 and resistance 25. By means of the unilateral capacitive coupling directed from the second grid 14 towards the first grid 15 the tuned circuit comprising the inductance coil 17 and the condensers 16 and 18 is excited by the oscillations generated in the tuned circuit 5—6. Nearby to or between the electrodes of the condenser 16 the organ to be tested is to be placed. The movements or displacements of said organ detune the circuit 16, 17, 18 and cause corresponding variations of the anode current $I_a$, respectively potential variations on the working resistance 19.

In Figure 2 the anode current $I_a$ is plotted as a function of the oscillator frequency $f_0.f_{s1}$ represents the natural frequency of the tuned circuit 16—17—18. The working point of the tube (advantageously on the middle, steep portion of the curve) can be tuned in by means of the variable condenser 6 in observing the milliamperemeter 26. The potential variations on the working resistance 19 in the anode 19 circuit feed the amplifier and the recording device 20. The resistance 21 and the by-pass condensers 22 remove the components of high frequency from the anode circuit of the hexode.

In Figure 3, the device 27 contains the coupling elements of Figure 1; the amplifier and the recording apparatus 20 together with the voltage sources will be arranged preferably in a particular container. The one electrode of the condenser 16 is placed above the place of the heart of the patient 28, the action of which is to be tested. The other electrode serves for balance with respect to unwanted influence from without. The recording device 20 makes records of the movements, respectively displacements, of the organ to be tested as function of the time. The forms of these movement-time diagrams are characteristic for certain diseases of the heart or lungs or veins, etc. Analogy: Electrocardiogram—electric potentials according to the excitement of the muscles of the heart is function of the time.

Object of the invention is also the balanced arrangement of the electrodes of the condenser 16 referring to "earth." It is also often advantageous to screen the inactive parts of the electrodes and the leads.

Instead of capacitive detuning of the tuned circuit 16—17—18 by means of the condenser 16, inductive detuning by means of the coil 17 arranged nearby to the organ to be tested can also be applied, or both kinds of detuning can be used at the same time. The damping of said tuned circuit will be varied to some extent in all cases.

Another object of the invention is supplying the feeding voltages for the tube 1 from the mains, the use of at least two consecutive stages of voltage stabilization to remove the fluctuations of the mains voltage from the anode of said tube, whereby at least in one stage, a stabilizer tube (tube filled with inert gas) is used, and the other stages can be represented also by stabilizing transformer, motor-generator or special tube circuit. Such a special tube circuit can be provided by adjusting the amplification of the tube 1 in order to balance the fluctuations of the supply voltages of the anode 23 and of the screen grid 13 respectively against another relative to the anode 23. In Figure 1, the two stage voltage stabilization is performed by means of the stabilizer tubes 29 and 31. Items 30 and 32 represent the required series-resistances.

We claim:

1. Device for functional test of organs of living bodies comprising a tuned circuit preferably balanced relative to "earth," whereby said organ is placed near said tuned circuit, preferably nearby or between the electrodes of a condenser connected to said tuned circuit, an electronic discharge tube having two control electrodes, to one of which said tuned circuit is connected, means for impressing an alternating potential preferably of high frequency on the other control electrode, means for exciting an alternating potential of the same frequency but nearly in phase quadrature therewith in said tuned circuit, an output circuit for said tube, and impedance means in said output circuit adapted to develop output energy varying in amplitude corresponding to the relative frequency departure of the potentials impressed on said control electrodes.

2. A device as claimed in claim 1 wherein the supply voltages for said tube are derived from a common source of current, especially from the electric mains system, comprising further at least two consecutive voltage stabilizing stages, whereby at least in one stage a stabilizing tube is used.

3. Device for functional test of organs of living bodies comprising a tuned circuit preferably balanced relative to "earth," whereby said organ is placed nearby to said tuned circuit, preferably nearby or between the electrodes of a condenser connected to said tuned circuit, a pentagrid-converter type tube, a regenerative system connected to the first two grids of said tube to excite an alternating voltage of preferably high frequency, whereby said tuned circuit is connected to the second control grid of said tube, an output circuit for said tube, and impedance means in said output circuit to develop output energy varying in amplitude corresponding to the relative frequency departure of said excited potential from the frequency to which said tuned circuit is resonant.

4. A device as claimed in claim 3 wherein the supply voltages for said tube are derived from a common source of current, especially from the electric mains system, comprising further at least two consecutive voltage stabilizing stages, whereby at least in one stage stabilizing tube is used.

5. Device for functional test of organs of living bodies comprising a tuned circuit preferably balanced relative to "earth," whereby said organ is placed nearby to said tuned circuit, preferably nearby or between the electrodes of a condenser connected to said tuned circuit, a triode-hexode type tube, a regenerative system connected to the electrodes of the triode to excite an alternating voltage of preferably high frequency, external capacitative coupling means between the two control grids of the hexode neutralizing the space charge coupling, whereby said tuned circuit is connected to the first control grid of the hexode-system of said tube, an output circuit for said tube, and impedance means in said output circuit to develop output energy varying in amplitude corresponding to the relative frequency departure of said excited potential from the frequency to which said tuned circuit is resonant.

6. A device as claimed in claim 5 wherein the supply voltages for said tubes are derived from a common source of current, especially from the electric mains system, comprising further at least two consecutive voltage stabilizing stages, whereby at least in one stage stabilizing tube is used.

LÁSZLÓ RÓSA.
IMRE ZAKARIÁS.